US012132742B2

(12) United States Patent
Odabaee et al.

(10) Patent No.: US 12,132,742 B2
(45) Date of Patent: Oct. 29, 2024

(54) COMMUNICATION DEVICE AND METHOD FOR APPLICATION LAYER-INDEPENDENT TRIGGERING OF EVENTS IN A COMMUNICATION NETWORK

(71) Applicants: Shervin Alireza Odabaee, Newport Coast, CA (US); Ahmadreza Rofougaran, Newport Beach, CA (US); Arman Rofougaran, Newport Beach, CA (US); Milan Rofougaran, Newport Beach, CA (US); Persia Odabaee, Newport Coast, CA (US); Kavian Odabaee, Newport Coast, CA (US); Ayla Odabaee, Newport Coast, CA (US)

(72) Inventors: Shervin Alireza Odabaee, Newport Coast, CA (US); Ahmadreza Rofougaran, Newport Beach, CA (US); Arman Rofougaran, Newport Beach, CA (US); Milan Rofougaran, Newport Beach, CA (US); Persia Odabaee, Newport Coast, CA (US); Kavian Odabaee, Newport Coast, CA (US); Ayla Odabaee, Newport Coast, CA (US)

(73) Assignee: AR & NS Investment, LLC, Newport Coast, CA (US)

( * ) Notice: Subject to any disclaimer, the term of this patent is extended or adjusted under 35 U.S.C. 154(b) by 155 days.

(21) Appl. No.: 17/719,464

(22) Filed: Apr. 13, 2022

(65) Prior Publication Data

US 2023/0336566 A1   Oct. 19, 2023

(51) Int. Cl.
*H04L 9/40* (2022.01)

(52) U.S. Cl.
CPC .......... *H04L 63/123* (2013.01); *H04L 63/162* (2013.01); *H04L 63/168* (2013.01)

(58) Field of Classification Search
CPC ... H04L 63/123; H04L 63/162; H04L 63/168; H04L 63/1416; H04L 63/1466; H04L 9/40
See application file for complete search history.

(56) References Cited

U.S. PATENT DOCUMENTS

| 2004/0147314 | A1* | 7/2004 | LeMay | G07F 17/32 |
| | | | | 463/30 |
| 2006/0161984 | A1* | 7/2006 | Phillips | G06F 21/564 |
| | | | | 713/188 |
| 2015/0293896 | A1* | 10/2015 | Runkis | G06F 3/0623 |
| | | | | 707/755 |

* cited by examiner

Primary Examiner — Quazi Farooqui
(74) Attorney, Agent, or Firm — CHIP LAW GROUP (57) ABSTRACT

A first communication device includes a processor that receives a data signal from a second communication device. The processor converts the data signal to a bit stream at a physical layer of a network architecture and executes a frame level inspection of the bit stream at a datalink layer for a defined signature. The processor detects the defined signature associated with a first data packet in a frame based on the executed frame level inspection of the bit stream at the datalink layer, where the defined signature associated with the first data packet is a unique indicator. An event is triggered in a communication network at the datalink layer irrespective of an involvement of an application layer of the network architecture at the first communication device based on the detected defined signature associated with the first data packet.

20 Claims, 7 Drawing Sheets

COMMUNICATION DEVICE AND METHOD FOR APPLICATION LAYER-INDEPENDENT TRIGGERING OF EVENTS IN A COMMUNICATION NETWORK

CROSS-REFERENCE TO RELATED APPLICATIONS/INCORPORATION BY REFERENCE

None.

FIELD OF TECHNOLOGY

Certain embodiments of the disclosure relate to a communication, verification, and security system. More specifically, certain embodiments of the disclosure relate to a communication device and a method for application layer-independent triggering of events in a communication network.

BACKGROUND

Every layer of a network architecture used for communication has its own unique function. In one example, the Open System Interconnection (OSI) model defines the networking framework (i.e., the hierarchical network architecture) for implementing protocols in seven layers, namely the application layer, the presentation layer, the session layer, the transport layer, the network layer, the data link layer, and the physical layer, where the application layer is considered the topmost layer and the physical layer is considered the bottom layer. Typically, at a given communication device, control is passed from one layer to the next, starting at the application layer (i.e., the human-computer interaction layer, for example, for transmission of user data) and proceeding up to the bottom layer, i.e., the physical layer. The physical layer is responsible for the transmission of raw data, which is simply a series of 0s and 1s, i.e., a raw bit stream, over a communication medium in the form of electrical impulse, light, or radio signal to another communication device, in which data signal received from physical layer moves up the hierarchical network architecture to the application layer to finally present the user data received in meaningful form (i.e., passes back up the hierarchy). The application layer supports application and end-user processes. In other words, the application layer is used by end-user software, such as web browsers and email clients. It provides protocols that allow the software to send and receive information and present meaningful data to users. A few examples of application layer protocols are the Hypertext Transfer Protocol (HTTP), File Transfer Protocol (FTP), Post Office Protocol (POP), Simple Mail Transfer Protocol (SMTP), and Domain Name System (DNS). The application layer is the most open-ended of all of the layers being the topmost layer, and the open-ended nature of the application layer is known to present threats. In one example, applications with weak or no authentication may be prime targets for unauthorized use and abuse over a network. In another example, software programs may have backdoors or shortcuts that bypass otherwise secure controls and provide unauthorized access.

In certain scenarios, it may be difficult to track every usage of a digital asset owned by a user after the digital asset is created. For example, the digital asset may be distributed or re-distributed multiple times across a single digital platform or across different digital platforms, and different applications may be used by various end-users to consume the digital asset. For instance, the non-fungible tokens (NFTs) concept is gaining popularity where any unique digital asset, for example, an image, video, audio, art, etc., can be tokenized as NFT. Consequently, several NFT marketplaces (NFTMs), have emerged in recent years to facilitate buying and selling NFTs with crypto payment, where the digital asset ownership transfer may happen in a single transaction and be recorded in a blockchain. Currently, the application layer controls any triggering of events, such as a blockchain event, an event associated with a smart contract, an event associated with a fungible token (e.g., a cryptocurrency), or an event associated with a non-fungible token (NFT), and the like. This creates a technical vulnerability in tracking of each and every usage of the digital asset or a digital service.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication device and a method for application layer-independent triggering of events in a communication network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a communication device and a method for application layer-independent triggering of events in a communication network. The communication device, the cloud server, the method of the present disclosure significantly reduces the latency and vulnerability involved in application-layer based processing and triggering of events by making the triggering mechanism be executed at the lowest digitalized layer (e.g., the datalink layer) of a network architecture (e.g., OSI network architecture). In other words, the communication device and the method of the present disclosure enables application layer-independent triggering of events in the communication network (e.g., a blockchain event, an event associated with a smart contract, an event associated with a fungible token (e.g., a cryptocurrency), or an event associated with a non-fungible token (NFT) may be triggered at the datalink layer in an example. This improves the reliability and accuracy of tracking each user consumption of a digital asset on a device, such as the communication device while reducing the known vulnerabilities of the application layer. The communication device and the method of the present disclosure provides an ecosystem to track any usage of a digital asset even if the digital asset is distributed or re-distributed multiple times across a single digital platform or across different digital platforms. In the following description, reference is made to the accompanying drawings, which form a part hereof, and which is shown, by way of illustration, various embodiments of the present disclosure.

Figure 1:
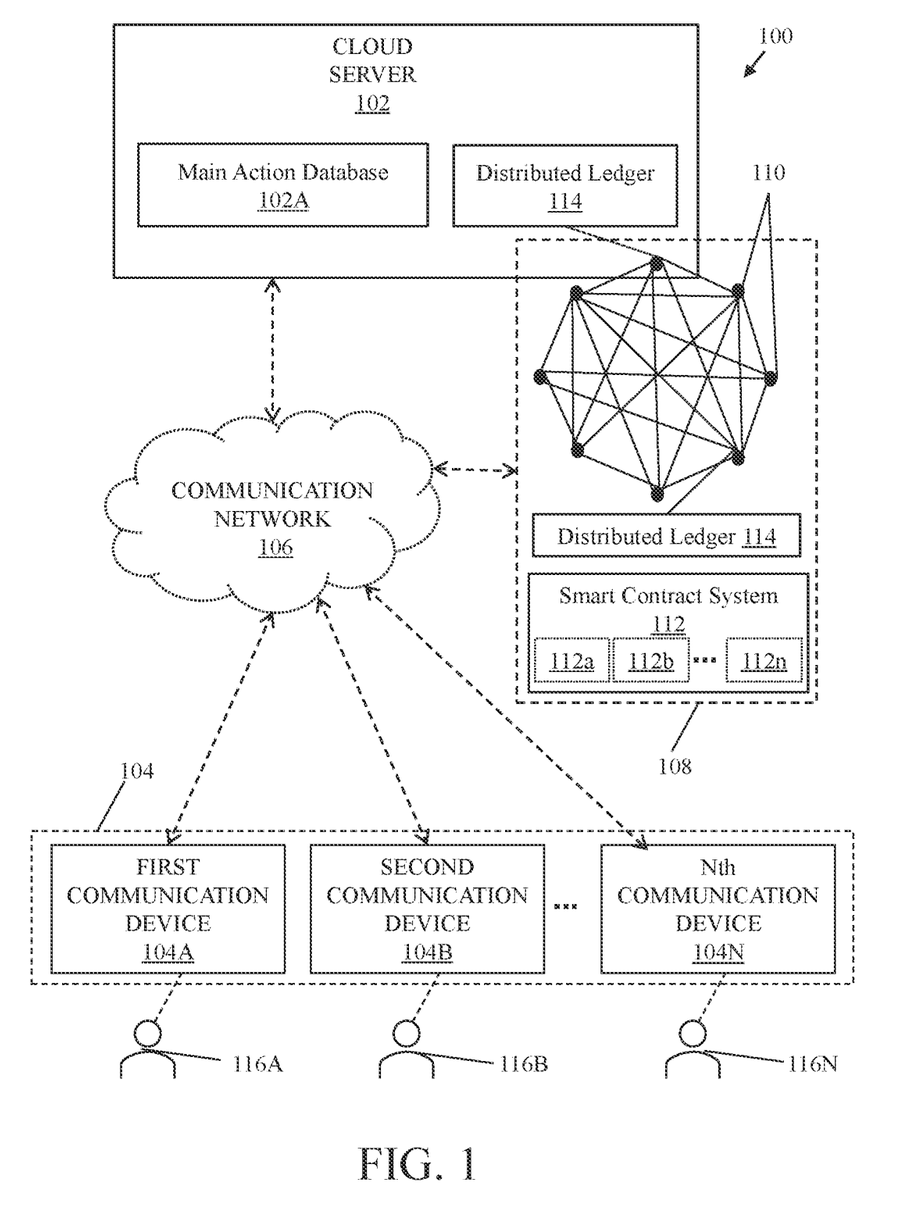
FIG. 1 is a network environment diagram illustrating various components of an exemplary ecosystem with a cloud server and communication devices for application layer-independent triggering of events, in accordance with an exemplary embodiment of the disclosure.

FIG. 1 is a network environment diagram illustrating various components of an exemplary ecosystem with a cloud server and communication devices for application layer-independent triggering of events, in accordance with an exemplary embodiment of the disclosure. With reference to FIG. 1, there is shown a network environment of an ecosystem 100 that includes a cloud server 102, a plurality of communication devices 104, such as a first communication device 104A, a second communication device 104B, . . . , and Nth communication device 104N. There is further shown a communication network 106 and a Distributed Ledger and Smart Contract (DLSC) system 108. The ecosystem 100 may further include a plurality of nodes 110 that are communicatively coupled to each other. The DLSC system 108 may include a smart contract system 112. There is further shown a distributed ledger 114 that remain distributed and in-sync in the plurality of nodes 110.

In an implementation, the cloud server 102 may be one of the plurality of nodes 110 and thus may also include the distributed ledger 114. In some implementations, each of the plurality of communication devices 104 may also be one of the plurality of nodes 110, may store the distributed ledger 114, may be a part of the DLSC system 108. In some other implementations, each of the plurality of communication devices 104 may not be required to store any distributed ledger 114 itself and may communicate with the cloud server 102, which in turn manage and facilitate any interaction with the DLSC system 108 for the plurality of communication devices 104. A plurality of users, such as users 116A, 116B, . . . , 116N, may interact with the cloud server 102 and the DLSC system 108 (directly or indirectly via the cloud server 102) using their respective communication devices via the communication network 106, as shown.

The cloud server 102 includes suitable logic, circuitry, and interfaces that may be configured to communicate with the plurality of communication devices 104 and other nodes of the plurality of nodes 110. In an implementation, the cloud server 102 may be a master cloud server or a master machine that is a part of a data center that controls an array of other cloud servers communicatively coupled to it, for load balancing, running customized applications, and efficient data management. The cloud server 102 may include a main action database 102A. The main action database 102A may be a database that defines an action corresponding to each defined signature (e.g., a unique indicator). In other words, the defined signature may be pre-registered and pre-assigned to the one or more predefined actions in the main action database 102A. The defined signature may be embedded in a data item so that every time the data item is played at any device, such as any one of the plurality of communication devices 104, the playing device may detect the defined signature at the lowest layer of the network architecture (i.e., a datalink layer), which then triggers an action defined in the main action database 102A. The actions may be predefined by a user or by an artificial intelligence (AI) system.

Each communication device of the plurality of communication devices 104 includes suitable logic, circuitry, and interfaces that may be configured to communicate with the cloud server 102. Each communication device of the plurality of communication devices 104 may be one of a consumer electronic (CE) device (such as a smartphone, a virtual reality headset, an augment reality device, and the like), an edge device, a repeater device, a small cell, a customer premise equipment (CPE), a road-side unit (RSU) device, a fixed wireless access (FWA) device, an in-vehicle device, telecommunication hardware, or user equipment (UE).

The communication network 106 may include a medium through which the various devices in the ecosystem 100, such as the cloud server 102, the plurality of communication devices 104, and the plurality nodes 110, may communicate with each other. In some embodiments, a secured and dedicated communication channel may be established between the plurality of communication devices 104 and the cloud server 102. The communication network 106 may be implemented by use of various wired and wireless communication protocols. Examples of such wired and wireless communication protocols may include, but are not limited to, at least one of a Transmission Control Protocol and Internet Protocol (TCP/IP), peer-to-peer network, User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device-to-device communication, cellular communication protocols, or Bluetooth (BT) communication protocols, or a combination thereof. Other examples of the communication network 106 may include, but are not limited to, the Internet, a cloud network, a Long Term Evolution (LTE) network, a secured Wireless Local Area Network (WLAN), a Local Area Network (LAN), a telephone line (POTS), or other wired or wireless networks.

In an implementation, the DLSC system 108 may refer to a blockchain network with associated smart contracts, such as the smart contracts 112a, 112b, . . . , 112n of the smart contract system 112.

In one example, each node of the plurality of nodes 110 may be configured to discover other nodes and then communicate the discovered nodes to known nodes in the DLSC system 108 (e.g., a blockchain network). Each node may be configured to communicate transactions to other nodes, regardless of whether the transactions originate with the node or were communicated to it by other nodes of the plurality of nodes 110. This way, any given transaction may be disseminated to all nodes of the plurality of nodes 110. Each node of the plurality of nodes 110 may be configured to maintain the distributed ledger 114. The distributed ledger 114 may include records of historical interactions in a time sequence related to the flow of events (e.g., start and end of an event) or movement of content rights from one user to another user. In some embodiments, in addition to content rights, the distributed ledger 114 may include records of historical interactions in a time sequence for user content consumption associated with each communication device of the plurality of communication devices 104, user content consumption related measurement data/analytics, and content catalog information, and the like.

In accordance with an embodiment, each node of the plurality of nodes 110 may cryptographically hash transaction data of each transaction. This hash may be then digitally signed by the transaction creator with a private key of a private key—public key pair. The public key is shared with other nodes, whereas the private key is kept as a secret. This allows a node to verify the creator (or the initiator) of the transaction and also that the transaction data may not be altered according to the hash digitally signed by the creator. Every single transaction may be verified by checking the distributed ledger 114 distributed at the plurality of nodes 110. Recent validated transactions may be grouped as a block, for example, a block of a custom blockchain, and hashed using a hashing algorithm defined by a protocol adopted by the blockchain (e.g., Ethereum blockchain). Each block may have a unique hash value that is derived from a previous block's final hash, transaction data's hash value, and a defined mathematical value. The rules of the protocol may be defined in the genesis block, i.e., the first group or block.

In accordance with an embodiment, transactions make up the core unit of data that may be recorded into the distributed ledger 114 of the DLSC system 108. Each transaction may be created by a node or a communication device of the plurality of communication devices 104, recorded into the distributed ledger 114, and then communicated to other nodes (or other communication devices if the other communication devices are also part of the blockchain network, such as the DLSC system 108) to be rejected and dismissed or validated and recorded into their ledgers, such as the distributed ledger 114 maintained at each node. The data traffic created by the transactions between the plurality of nodes 110 and the plurality of communication devices 104 via the cloud server 102 is what defines the ecosystem 100 or the marketplace for creating, using, tracking usage, selling, or buying of a digital asset, and further seeking permission of a service (e.g., a telecommunication service to improve quality of service, permission to fly a drone near an airport through dynamic smart contract via the DLSC system 108), provisioning of the requested service, movement of ownership of content rights, and the like. Generally, the term "digital asset" may refer to any type of media, for example, audio, a video, a data cast, a piece of music, a text, an image, a graphic item, an article, a photo, a photo gallery, a video gallery, an infographic, a map, a poll, a guest biography, a tweet, a social media post, a blog post, a virtual land, a gaming character, or any item that may be converted to an NFT, and/or the like. Moreover, each of the transactions may be, for example, a) an announcement of a newly created user; b) an announcement of the newly available content item, such as a digital asset; d) acquisition of rights to content; e) a user consumption of a content item; and f) an occurrence of an event that is registered in the blockchain of the DLSC system 108. The transactions may occur in a sequence, forming a chain of events. In an implementation, only new transaction in the distributed ledger 114 may be added, and a previous transaction is not editable or changeable. As a copy of the distributed ledger 114 may be maintained at each node of the plurality of nodes 110, where a deliberate attempt to modify a previous transaction at one node may not be matched or found in copies of the distributed ledger 114 maintained by other nodes, and thus, such modification is not accepted. Thus, events occurrence history maintained by way of a sequence of transactions is immutable and secured.

The smart contract system 112 may include a number of smart contracts, such as smart contracts 112a, 112b, . . . , 112n. Each smart contract may be a set of instruction (e.g., a program) stored on a blockchain, such as the DLSC system 108, that runs when predetermined conditions are met, for example, to trigger an action defined in the main action database 102A when a defined signature is detected by the cloud server 102 or any one of the plurality of communication devices 104. Alternatively, the defined signature may point to an action in the main action database 102A, which then triggers a smart contract. In other words, the detection of the defined signature in a packet or a frame by a given device, such as the first communication device 104A, may first point to the main action database 102A to find what action to execute next and that action may be an execution of a specific smart contract. Alternatively, the detection of the defined signature in a packet or a frame of user data by a given device, such as the first communication device 104A, may first point to a specific smart contract which, when executed, leads to a search in the main action database 102A to find what action to execute next. The defined signature, its detection, and operations associated with a communication device of the plurality of communication devices 104, has been described in detail, for example, in FIGS. 4, 5, and 6A to 6C.

Beneficially, the present disclosure provides the ecosystem 100 that enables application layer-independent triggering of events in the communication network 106 (e.g., a blockchain event, an event associated with a smart contract, an event associated with a fungible token (e.g., a cryptocurrency), or an event associated with a non-fungible token (NFT) may be triggered at the datalink layer in an example. Currently, it is well known that the application layer of a network architecture (e.g., the topmost layer of the 7 layer OSI model) controls any triggering of events, such as a blockchain event, an event associated with a smart contract, an event associated with a fungible token (e.g., a cryptocurrency), or an event associated with a non-fungible token (NFT), and the like. In conventional systems, such a triggering mechanism for recording any transaction or initiating any event is controlled by the topmost layer of the network architecture, which creates a technical vulnerability and a challenge in the tracking of each and every usage of the digital asset or a digital service. In other words, the tracking may not be possible for every instance of usage (e.g., a user consumption, such as view, download, access, playing, or gaining ownership rights of the digital asset, or provisioning any customized service in telecommunications) may not be failsafe in existing systems.

In contrast to the existing systems, the communication devices, such as the first communication device 104A, and the method of the present disclosure removes the dependency on the application layer for being the source of triggering events, such as events related to a smart contract, blockchain, NFT related transactions, or fungible tokens, and enables to bring the triggering mechanism down to the lowest of the digitized layer in the networking hierarchy, i.e., the datalink layer. In other words, the communication devices, such as the first communication device 104A, and the method of the present disclosure enables application layer-independent triggering of events in the communication network 106 (e.g., a blockchain event, an event associated with a smart contract, an event associated with a fungible token (e.g., a cryptocurrency), or an event associated with a non-fungible token (NFT) may be triggered at the datalink layer). This in turn improves the reliability and accuracy of tracking each user consumption of a digital asset on a device, such as the first communication device 104A, while reducing the known vulnerabilities of the application layer. Furthermore, the plurality of communication devices 104 and the method of the present disclosure provides the ecosystem 100 to track any usage of a digital asset even if the digital asset is distributed or re-distributed multiple times across a single digital platform or across different digital platforms. Thus, the ecosystem 100 manifest higher quality of experience (QoE) and reliable digital asset usage and consumption tracking on-the-fly as compared to existing systems.

Figure 2:
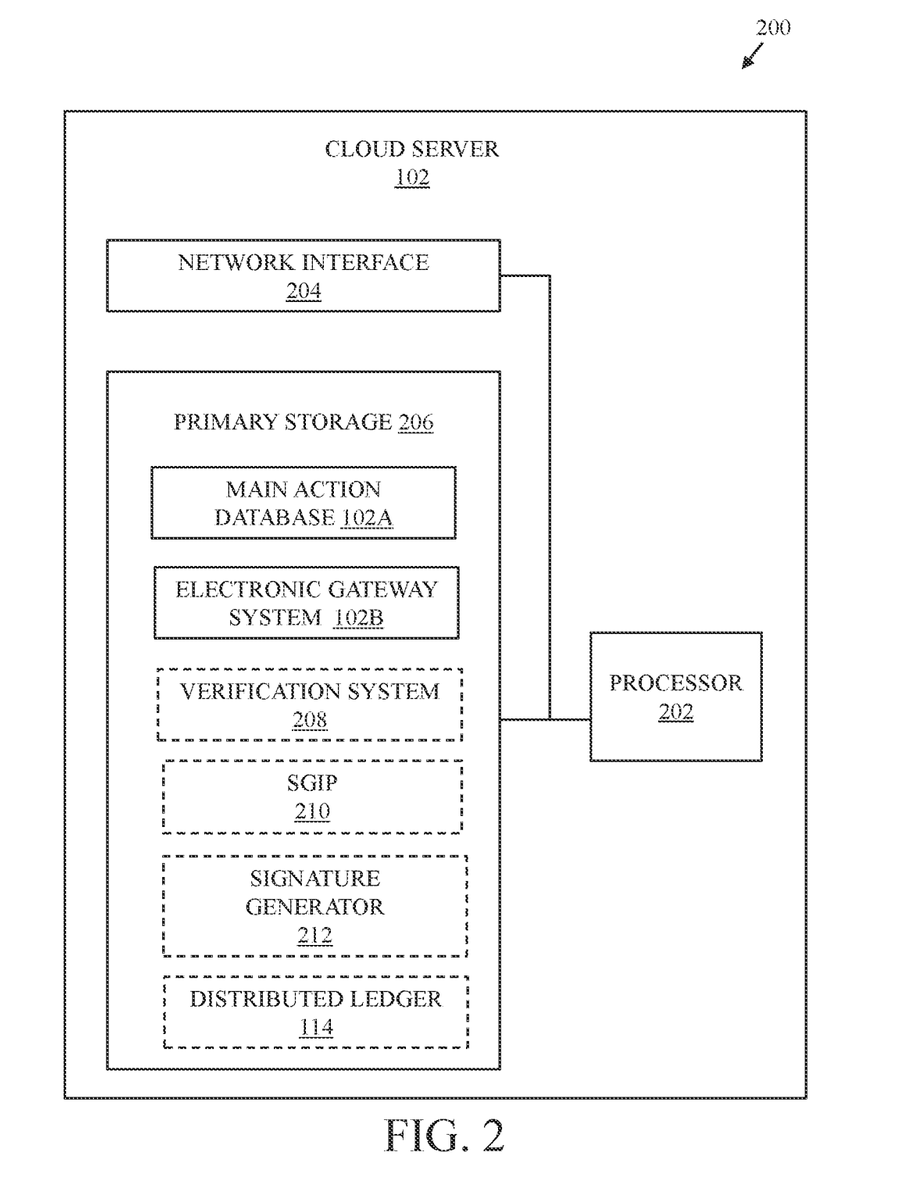
FIG. 2 is a block diagram illustrating different components of an exemplary cloud server, in accordance with an embodiment of the disclosure.

FIG. 2 is a block diagram illustrating different components of an exemplary cloud server, in accordance with an embodiment of the disclosure. FIG. 2 is explained in conjunction with elements from FIG. 1. With reference to FIG. 2, there is shown a block diagram 200 of the cloud server 102. The cloud server 102 may include a processor 202, a network interface 204, and a primary storage 206. The primary storage 206 may further include the main action database 102A, an electronic gateway system 102B, a verification system 208, a signature generating instructions package (SGIP) 210, and a signature generator 212. In an implementation, the cloud server 102 may be a part of the DLSC system 108 and may be one of the plurality of nodes 110. In such a case, the primary storage 206 may further include the distributed ledger 114.

The processor 202 may be communicatively coupled to the network interface 204 and the primary storage 206. The processor 202 may be configured to execute various operations of the cloud server 102. The processor 202 may be configured to control various components of the cloud server 102. Examples of the implementation of the processor 202 may include but are not limited to a central processing unit (CPU) platform including one or more processors, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or control circuitry.

The network interface 204 may comprise suitable logic, circuitry, interfaces, and/or code that may be configured to connect and communicate with the plurality of communication devices 104. In an implementation, one or more of the plurality of communication devices 104 may be one or more nodes of the plurality of nodes 110 in the ecosystem 100. Thus, the network interface 204 may communicate with the plurality of nodes 110 via the communication network 106. The network interface 204 may implement known technologies to support wired or wireless communication. The network interface 204 may include, but are not limited to a network interface card (NIC), an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 204 may communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE 4G, 5G, time division multiple access (TDMA), BLUETOOTH™, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VOIP), Wi-MAX, light-fidelity (Li-Fi), Internet-of-Things (IoT) technology, Machine-Type-Communication (MTC) technology, a protocol for email, instant messaging, Short Message Service (SMS), or quantum entanglement based communication.

The primary storage 206 may be configured to store the main action database 102A, the electronic gateway system 102B, the verification system 208, the signature generating instructions package (SGIP) 210, and the signature generator 212. The primary storage 206 may be further configured store values calculated by the processor 202. Examples of the implementation of the primary storage 206 may include, but not limited to, a cloud-based storage, a storage array, or other memory and storage systems. There may be one or more secondary storage servers, such as backup servers, which may implement backup policies for an automatic backup of data of the primary storage 206.

The electronic gateway system 102B may be a system that is configured to present an online platform to any one of the plurality of communication devices 104 so that a given user may register itself and register a digital asset in the online platform, which is then associated with the DLSC system 108. The electronic gateway system 102B may be a presentation system that allows remote user interaction with the cloud server 102, for example, to create an NFT, for viewing any NFT, tracking usage of any NFT in the same platform, or other platforms using the defined signature, and transferring ownership of rights of the digital asset and the like. For example, the cloud server 102 may be configured to present the online platform using the electronic gateway system 102B for the first communication device 104A to connect, interact, and consume the digital asset. In an implementation, the electronic gateway system 102B may be configured to present metadata of multiple content libraries that may be owned by different entities, for example, different content owners, distributors, re-distributors, VOD service providers, NFTs, and the like, as a unified content library for its registered users, such as the user 116A, to navigate.

The verification system 208 may be configured to verify a given defined signature received from a given communication device of the plurality of communication devices 104. The verification system 208 may have access to a list of defined signatures (e.g., a hash index table), which may be matched to see if the received defined signatures is present in the list of defined signatures and if present, what is the corresponding action to be executed as defined in the main action database 102A for that particular defined signature for which the match was confirmed.

The signature generating instructions package (SGIP) 210 may be an instruction pack that may be communicated to any of the plurality of communication devices 104 on request. In a case where a given communication device of the plurality of communication devices 104 do not have pre-installed instructions to generate the defined signature, the given communication device may be configured to acquire the SGIP 210 from the cloud server 102 to generate the defined signature. For example, a binary version of a source code may be downloaded to generate a given defined signature that can be detected at a packet level or frame level. In other words, a hashing algorithm that provides and generates unique hash values may be made available in binary format so that third party entities or any devices may use it and define an action for the defined signature in the ecosystem 100.

The signature generator 212 may be configured to generate the defined signature, which may be a unique indicator. Once the SGIP 210 is installed, the signature generator 212 may be obtained, having logic to generate a new signature and define an action for the generated signature. In an implementation, the defined signature may be a defined indicator or flag, a pre-generated index, or a pattern may be recognizable by a hardware logic, a driver code, a firmware code, an uBoot image of a device. In an example, the defined signature may be implemented as a hashed value index, which may be generated by the signature generator 212.

Figure 3:
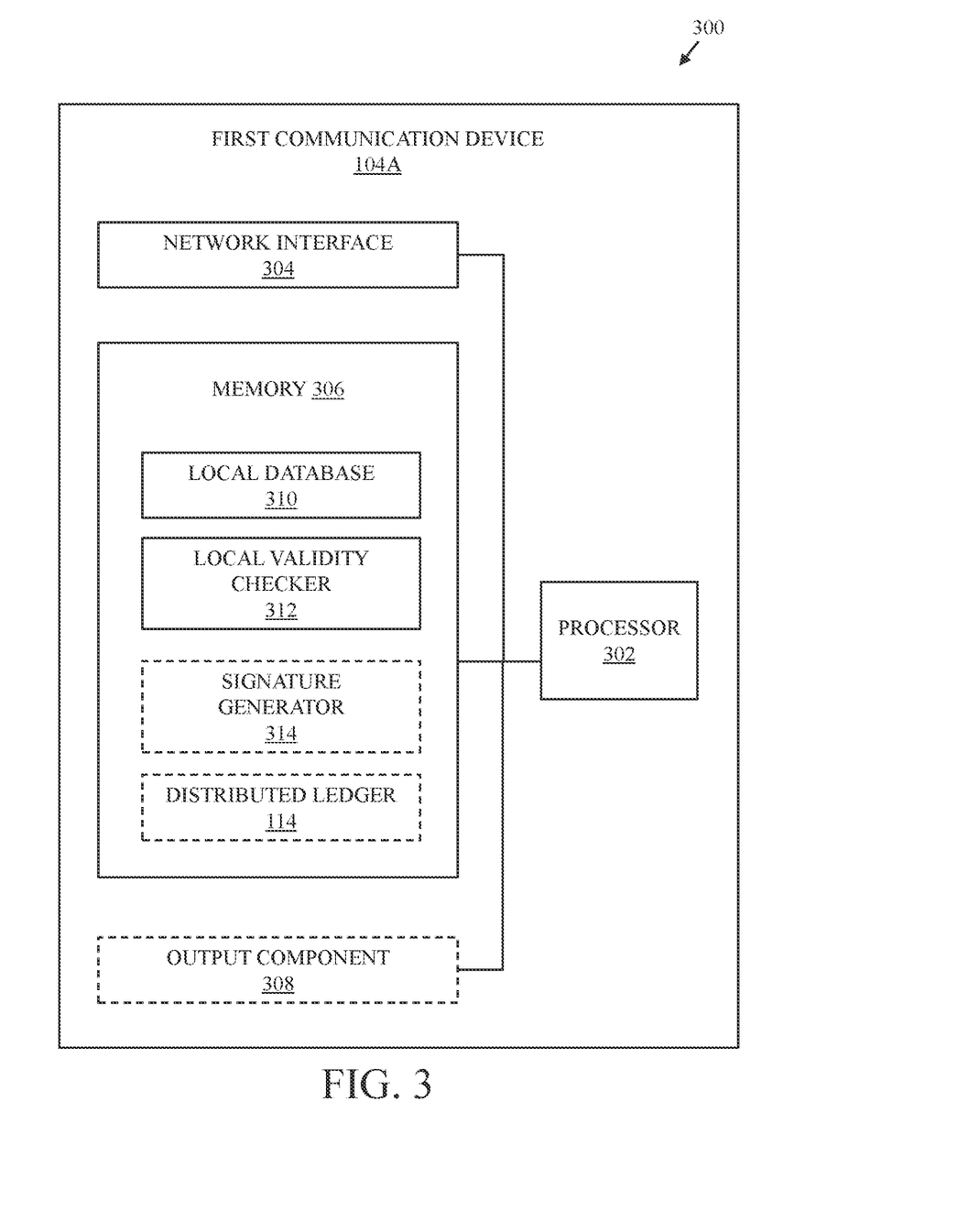
FIG. 3 is a block diagram illustrating different components of an exemplary communication device, in accordance with an embodiment of the disclosure.

FIG. 3 is a block diagram illustrating different components of an exemplary communication device, in accordance with an embodiment of the disclosure. FIG. 3 is explained in conjunction with elements from FIGS. 1 and 2. With reference to FIG. 3, there is shown a block diagram 300 of the first communication device 104A. The first communication device 104A may include a processor 302, a network interface 304, a memory 306, and an output component 308. The memory 306 may include a local database 310, a local validity checker 312, a signature generator 314. In some implementations, the first communication device 104A may be one of the plurality of nodes 110. In such a case, the memory 306 may further include the distributed ledger 114.

The processor 302 may be communicatively coupled to the network interface 304, the memory 306, and the output component 308. The processor 302 may be configured to execute various operations of the first communication device 104A. The first communication device 104A may be a programmable device, where the processor 302 may execute instructions stored in memory 306. Examples of the implementation of the processor 302 may include, but are not limited to an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

The network interface 304 may comprise suitable logic, circuitry, interfaces, and/or code that may be configured to communicate with the cloud server 102 via the communication network 106. In an implementation, the first communication device 104A may be one of the plurality of nodes 110 in the ecosystem 100 may communicate with the plurality of nodes 110 via the communication network 106. The network interface 304 may implement known technologies to support wired or wireless communication. Examples of the network interface 304 may include but are not limited to a network interface card (NIC), an antenna, a radio frequency (RF) transceiver, and the like.

The memory 306 may be configured to store the local database 310, the local validity checker 312, and the signature generator 314. Examples of the implementation of the memory 306 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The local database 310 may be a database that may reside in each of the plurality of communication devices 104, i.e., a servicing entity or hardware. The local database 310 may be a memory structured database to upload the serviced defined signature and to eventually synchronize with the cloud server 102, for example, in a bi-directional synchronization. In an implementation, the local database 310 may be implemented as a memory cache to assist with look ups for defined signatures at wire speed using the downloaded SGIP 210. In another implementation, there may be a separate cache for lookups, for example, a subset of the local database 310. The local validity checker 312 may be configured to execute a local validity check of the defined signature at a given communication device of the plurality of communication devices 104 for verification when the defined signature associated with a data packet when detected at the datalink layer. The signature generator 314 may be similar to the signature generator 212 of the cloud server 102.

In an implementation, the output component 308 may be part of the first communication device 104A. In such a case, the output component 308 may be an audio output device, a display device, or a combination thereof. In another implementation, the output component 308 may be distinct from the first communication device 104A and may be communicatively coupled to the first communication device 104A.

Figure 4:
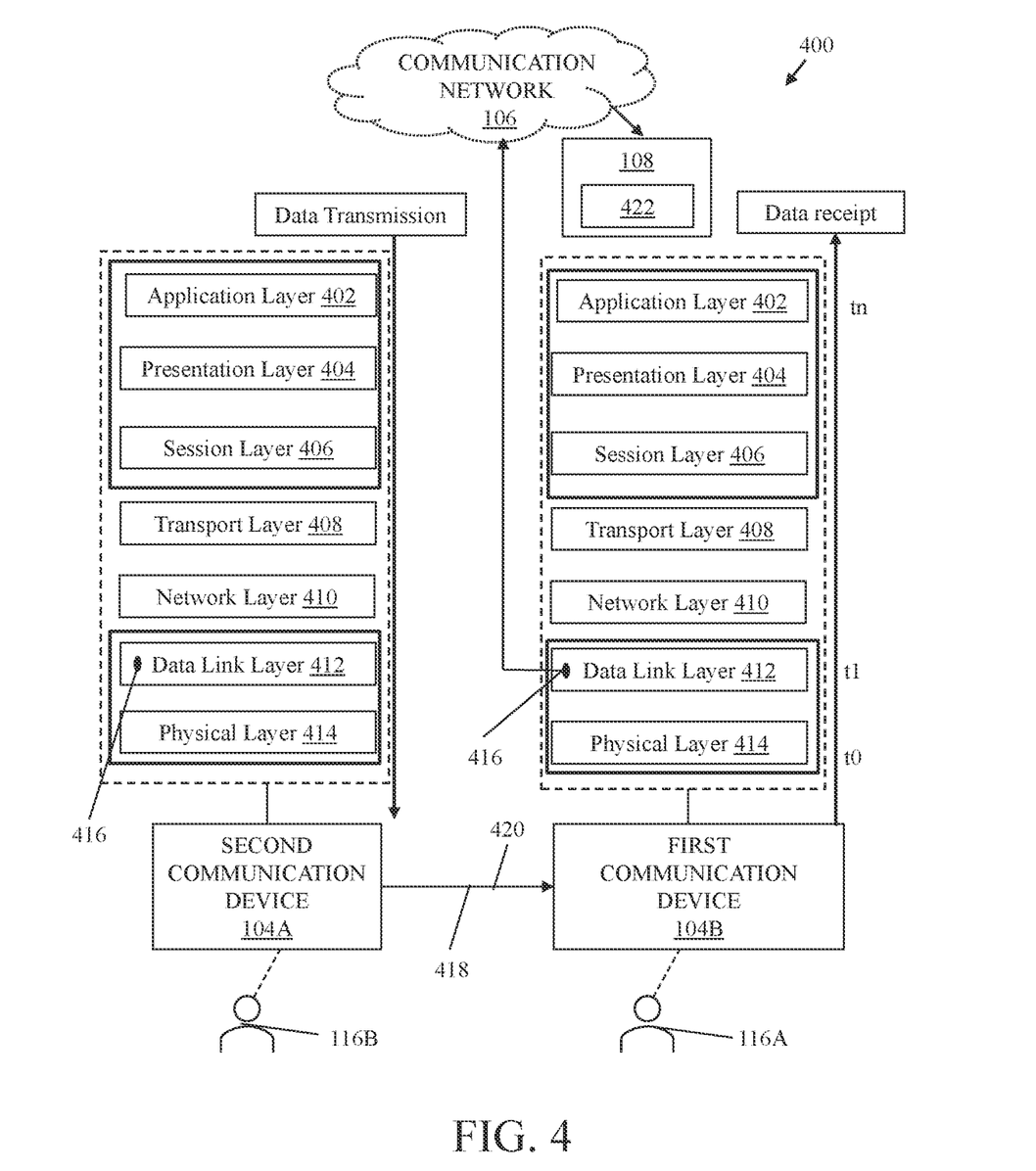
FIG. 4 is a diagram illustrating a network architecture for communication over a communication medium between two communication devices for application layer-independent triggering of events in a communication network, in accordance with an embodiment of the present disclosure.

FIG. 4 is a diagram illustrating a network architecture for communication over a communication medium between two communication devices for application layer-independent triggering of events in a communication network, in accordance with an embodiment of the present disclosure. FIG. 4 is explained in conjunction with elements from FIGS. 1, 2, and 3. With reference to FIG. 4, there is shown a network architecture 400 for communication over a communication medium 418 between two communication devices, such as the first communication device 104A and the second communication device 104B, for application layer-independent triggering of events in the communication network 106.

In an example, the network architecture 400 may be explained using an Open Systems Interconnection (OSI) model well known in the art that specifies seven hierarchical layers (i.e., an application layer 402, a presentation layer 404, a session layer 406, a transport layer 408, a network layer 410, a datalink layer 412, and a physical layer 414) that computer systems use to communicate over a network. The application layer 402 may be used by end-user software applications, where the application layer 402 provides protocols that allow software to send and receive information and present meaningful data to users. The presentation layer 404 typically defines how two communication devices encrypt and compress data, so it is received correctly on the other end. The session layer 406 is known to maintain connections and is responsible for controlling ports and sessions. In another example of the network architecture 400, for example, Transfer Control Protocol/Internet Protocol (TCP/IP), the functionalities of the application layer 402, the presentation layer 404, and the session layer 406 is combined into the application layer 402. Moreover, the datalink layer 412 and the physical layer 414 is further combined into a network access layer. Thus, for the present disclosure, the datalink layer 412 may be construed to encompass the network access layer and refer to the lowest layer of a given networking layers hierarchy, such as the network architecture 400, where the data is first available in digitized format.

Typically, in the OSI model, the datalink layer 412 is responsible for establishing and terminating a connection between two connected devices on a network. The datalink layer 412 breaks up packets into frames and sends them from the source device to the destination device. The datalink layer 412 may be composed of two parts—Logical Link Control (LLC), which identifies network protocols, performs error checking and synchronizes frames, and Media Access Control (MAC), which uses MAC addresses to connect devices and define permissions to transmit and receive data. Currently, the application layer 402 controls any triggering of events, such as a blockchain event, an event associated with a smart contract, an event associated with a fungible token (e.g., a cryptocurrency), or an event associated with a non-fungible token (NFT), and the like. In conventional systems, such triggering mechanism for recording any transaction or initiating any event is controlled by the topmost layer of the network architecture 400, i.e., the application layer 402, which creates a technical vulnerability and a challenge in the tracking of each and every usage of the digital asset or a digital service. In other words, the tracking may not be possible for every instances of usage (e.g., a user consumption, such as view, download, access, playing, or gaining ownership rights of the digital asset, or provisioning any custom service in telecommunications) may not be failsafe in existing systems. The communication devices, such as the first communication device 104A, and the method of the present disclosure removes the dependency on the application layer 402 (i.e., the topmost layer of the network architecture 400) for being the source of triggering events, such as events related to a smart contract, blockchain, NFT related transactions, or fungible tokens, and enables to bring the triggering mechanism down to the lowest of the digitized layer in the networking hierarchy, i.e., the datalink layer 412. In other words, the communication devices, such as the first communication device 104A, and the method of the present disclosure enables application layer-independent triggering of events in the communication network 106 (e.g., a blockchain event, an event associated with a smart contract, an event associated with a fungible token (e.g., a cryptocurrency), or an event associated with a non-fungible token (NFT) may be triggered at the datalink layer 412).

In accordance with an embodiment, the user 116B who may operate the second communication device 104B may want to transmit a digital asset, such as an image, to the first communication device 104A. In an example, the second communication device 104B may be an electronic device, such as a smartphone, communicatively coupled to the communication network 106. In another example, the second communication device 104B may be a server, such as the cloud server 102, which may be configured to present an online platform (e.g., the electronic gateway system 102B) for the first communication device 104A to connect, interact, and consume the digital asset. In an implementation, the electronic gateway system 102B may be configured to present metadata of multiple content libraries that may be owned by different entities, for example, different content owners, distributors, re-distributors, VOD service providers, NFTs, and the like, as a unified content library for its registered users, such as the user 116A, to navigate.

Typically, at a given communication device, such as the second communication device 104B, control is passed from one layer to the next, starting at the application layer 402 and proceeding up to the physical layer 414 for transmitting user data (e.g., the image). The physical layer 414 of the second communication device 104B may be responsible for the transmission of raw data, which is simply a series of 0s and 1s, i.e., a raw bit stream, over the communication medium 418, in the form of a data signal 420.

In the present disclosure, before the user data (i.e., the digital asset, such as the image) leaves the second communication device 104B, a defined signature 416 may be embedded and associated with the user data. In an implementation, the defined signature 416 may be embedded in a portion of user data that is to be transmitted by the second communication device 104B. In an implementation, the embedding of the defined signature 416 may be done using an application and may involve the application layer 402 of the second communication device 104B. In another implementation, the embedding of the defined signature 416 and associating the defined signature 416 with a given packet, may be done directly at the network layer 410 or the datalink layer 412. The defined signature 416 may be associated with one of the data packets and may be a unique indicator.

In an implementation, the defined signature 416 may be a defined indicator or flag, a pre-generated index, or a pattern that may be recognizable by a hardware logic, a driver code, a firmware code, an uBoot image of a device. In an example, the defined signature 416 may be implemented as a hashed value index. The hashed vale index may be generated as a result of combining (XOR-ing) a bunch of other numeric or alphanumeric values. The hashed value index (i.e., a given hash value) used as a signature may be memory efficient as indexing of a table of hash values may be comparatively faster and requires less memory space in a memory device (both local memory of communication devices, and at the cloud server 102 that may store millions of unique defined signatures). In another implementation, the defined signature 416 may be a unique code, for example, an alphanumeric of a defined length. In yet another implementation, the defined signature 416 may be a combination of an identifier (ID) of a user generating the signature, a unique code for the digital asset, and a number added incrementally for each consecutive packet of the same digital asset. Each defined signature, such as the defined signature 416, may be pre-defined, pre-registered, and pre-assigned to an action (i.e., a predefined action). Alternatively stated, all defined signatures may be predefined, pre-registered, pre-assigned to a corresponding set of actions.

In accordance with an embodiment, in a case where the second communication device 104B do not have pre-installed instructions to generate the defined signature 416, the second communication device 104B may be configured to acquire the instructions from the cloud server 102 to generate the defined signature 416. For example, a binary version of a source code may be downloaded to generate a given defined signature that can be detected at a packet level or frame level. In other words, a hashing algorithm that provides and generates unique hash values may be made available in binary format so that third party entities or any devices may use it and define an action for the defined signature 416 (i.e., what event is to be triggered when the defined signature 416 is detected using the ecosystem 100). Thus, the second communication device 104B may be configured to communicate a data signal 420 to the first communication device 104A. The data signal 420 may comprise the defined signature 416, which may be associated with at least a portion of the user data.

The processor 302 of the first communication device 104A may be configured to receive the data signal 420 from the second communication device 104B. The data signal 420 may be received over the communication medium 418. The communication medium 418 may be a wired or wireless medium. For example, the data signal 420 received from the second communication device 104B may be a wireless radio signal, an electrical signal received via a physical electrically conductive medium (e.g., a wired medium), or an optical signal. The processor 302 of the first communication device 104A may be further configured to convert the data signal 420 to a bit stream at the physical layer 414 of the network architecture 400. The bit stream refers to raw data (e.g., a series of "0" and "1" bits).

The processor 302 may be further configured to execute a frame level inspection of the bit stream at the datalink layer 412 for the defined signature 416. The processor 302 may be further configured to detect the defined signature 416 associated with a first data packet in a frame based on the executed frame level inspection of the bit stream at the datalink layer 412. The defined signature 416 associated with the first data packet may be a unique indicator.

It is well-known that a frame is a digital data transmission unit and may also be referred to as a protocol data unit (PDU). In this case, the first communication device 104A may be the receiver device that picks up the data signal 420 from its hardware, such as the network interface 304, and assembles it into frames. In an example, a given frame may comprise frame header, payload (i.e., the user data), trailer, and flag, also known in the art. The frame header may comprise a destination address, a source address and control fields, such as kind, seq, and ack, where the kind field may state whether the frame may be a data frame or used for control functions like error and flow control or link management, and the like. The "seq" field may comprise a sequence number of the frame for rearrangement of out-of-sequence frames and sending acknowledgements.

In the present disclosure, in an implementation, the processor 302 may be further configured to detect the defined signature 416 in a frame by inspection of the frame header, where the frame header may be modified to include an illegal type of frame header, such as an undefined frame header type. This illegal type may then point to a certain portion of the payload, where the defined signature resides (e.g., it may point to a unique hash index value). In another implementation, the processor 302 may be further configured to detect the defined signature 416 in the frame by detecting a predefined pattern in the frame header which is indicative of an upcoming signature (i.e., the defined signature 416) in a portion of the payload (i.e., the user data). In yet another implementation, the defined signature 416 may be detected using a correlator and a match filter that may detect the defined signature 416. The correlator and a match filter may be implemented as a hardware logic or a driver and may be pre-installed or acquired from the cloud server 102 when in operation. The detection of the defined signature 416 in a frame or packet may occur for an Ethernet communication (i.e., IEEE 802.3 frame format), network packets of wireless signals (e.g., IEEE 802.11 frame structure) or cellular communication (e.g., 5G New Radio (NR) frame format), or true 5G radio frame. In other words, the frame may be a radio frame, an Ethernet frame, or 802.11 based frame.

In accordance with an embodiment, the processor 302 may be further configured to execute an online cloud level verification or an offline device level verification of the defined signature 416. In the case of the online cloud level verification, the processor 302 may be further configured to communicate the defined signature 416 to the cloud server 102 for verification when the defined signature 416 associated with the first data packet is detected at the datalink layer 412. Thereafter, the processor 302 may be further configured to execute a standard flow of a plurality of data packets from the physical layer 414 to the application layer 402 for playing of corresponding data associated with the plurality of data packets on the output component 308 until a decision datum confirming the verification of the defined signature 416 as successful is obtained from the cloud server 102. Alternatively stated, the processor 302 may not immediately interrupt decryption and playback of a next data packet after the first data packet and may continue to serve the user 116A until the decision of the cloud server 102 reaches the first communication device 104A. In an implementation, the output component 308 may be a part of the first communication device 104A, for example, an audio device or a display device of the first communication device 104A. In another implementation, the output component 308 may be an external component, such as another device distinct from the first communication device 104A and communicatively coupled to the first communication device 104A. For example, in a case where the first communication device 104A is a repeater device, the actual consumption of the user data may occur at a UE being served by the repeater device, where the repeater device may not have an inbuilt display or audio component.

In accordance with an embodiment, the processor 302 may be further configured to maintain the standard flow of the plurality of data packets from the physical layer 414 to the application layer 402 for the playing of the corresponding data associated with the plurality of data packets on the output component 308 upon verification of the defined signature 416 as successful. Alternatively, the processor 302 may be further configured to interrupt a next data packet from playing when the decision datum obtained from the cloud server 102 confirms the verification of the defined signature 416 as unsuccessful.

In accordance with an embodiment, in the case of the offline device level verification, the processor 302 may be further configured to execute a local validity check of the defined signature 416 at the first communication device 104A for verification when the defined signature 416 associated with the first data packet is detected at the datalink layer 412. The local validity check of the defined signature 416 at the first communication device 104A may comprise executing a pattern recognition of the defined signature 416 based on at least one of a predefined hardware logic, a predefined driver code, a predefined firmware code, a hashed value index, a bootable image, an operating system kernel image, or a binary image present in the first communication device 104A.

In accordance with an embodiment, the processor 302 may be further configured to execute the standard flow of the plurality of data packets from the physical layer 414 to the application layer 402 for playing of corresponding data associated with the plurality of data packets on the output component 308 until a decision datum confirming the verification of the defined signature 416 as successful is obtained locally based on the local validity check of the defined signature 416 at the first communication device 104A. The processor 302 may be further configured to maintain the standard flow of the plurality of data packets from the physical layer 414 to the application layer 402 for the playing of the corresponding data associated with the plurality of data packets on the output component 308 upon verification of the defined signature 416 as successful from the local validity check of the defined signature 416 at the first communication device 104A. Alternatively, the processor 302 may be further configured to interrupt the next data packet from playing at the output component 308 when the decision datum confirms the verification of the defined signature 416 as unsuccessful. The decision datum may be obtained locally based on the local validity check of the defined signature 416 at the first communication device 104A.

The processor 302 may be further configured to trigger an event in the communication network 106 at the datalink layer 412 irrespective of involvement of an application layer 402 of the network architecture 400 based on the detected defined signature 416 associated with the first data packet. In an example, the defined signature 416 may be associated with a first portion (e.g., may be embedded in the first packet) of user data (i.e., the payload) received from the second communication device 104B, where the linkage among the plurality of data packets (i.e., sequence of packets or frames) may be managed by the servicing protocol of the network architecture 400. For instance, any of the layers responsible for such management of the sequence of data packets (e.g., datalink layer 412, the network layer 410, the transport layer 408, the session layer 406) of the network architecture 400. For instance, there may be a data stream playing a song. The defined signature 416 may be associated with the first 64-byte packet's payload, which indicates that this song requires payment as a predefined set of actions to be paid by a token, such as a fungible token (e.g., a cryptocurrency). The ecosystem 100 may be configured to detect the defined signature 416 at the lowest digitized layer (e.g., the datalink layer 412) without the need for the user data to involve the application layer 402 and trigger predefined the action required, such as the requirement of the payment to continue playing the remaining part of the song. The network architecture 400 and its layers may manage the packet linkage and its management, and the operations of the processor 302 may not interfere with the other operations and layers of the network architecture 400 except that the triggering mechanism modified and improved to be managed at the lowest digitized layer of the networking hierarchy (e.g., the datalink layer 412 of the network architecture 400).

In accordance with an embodiment, the defined signature 416 may be pre-registered and pre-assigned to the one or more predefined actions in the main action database 102A. Thus, the processor 302 may be further configured to trigger one or more predefined actions defined in the main action database 102A when the defined signature 416 associated with the first data packet is detected at the datalink layer 412. The main action database 102A may be an external database that resides either in one or more other communication devices different from the first communication device 104A or resides in the cloud server 102 (FIG. 1).

In an implementation, the triggering of the event in the communication network 106 may comprise triggering a new event in the distributed ledger 114 of a blockchain 422 (i.e., the DLSC system 108) at the datalink layer 412 without the involvement of the application layer 402 of the network architecture 400. In an implementation, the triggering of the event in the communication network 106 further comprises triggering a smart contract 112a (of the smart contract system 112) associated with the blockchain 422 at the datalink layer 412 without the involvement of the application layer 402 of the network architecture 400.

In accordance with an embodiment, the detection of the defined signature 416 and the triggering of the event may be executed at a wire speed. Thus, the processor 302 may be further configured to interrupt or corrupt a flow of the data stream when one of the following occurs: a) when the cloud server 102 or the local validity check confirms the verification of the defined signature 416 as unsuccessful; b) when a copyright check of the played data stream (e.g., the song) reveals a copyright infringement or theft; or c) when the action defined in the main action database 102A for the defined signature 416 indicates for immediate termination of the data stream being played. In such a case, the processor 302 may be configured to block the data stream, drop the upcoming packets or corrupt the final checksum to abort such activity and report back the reason (to the application layer 402 of the first communication device 104A and create an entry in a cloud log of the cloud server 102).

In yet another implementation, the defined signature 416 may be embedded in a plurality of portions of the user data that is to be transmitted by the second communication device 104B. In yet another implementation, a plurality of different defined signatures may be embedded in the plurality of portions of the user data that is to be transmitted by the second communication device 104B to the first communication device 104A. In such an implementation, the plurality of different defined signatures may trigger a different type of event in the communication network 106. In an implementation, each of the plurality of different defined signatures may be linked to a different action in the main action database 102A, which in turn may trigger different events as defined by a user.

In an exemplary scenario, a user, such as the user 116A, of the first communication device 104A, may create an NFT at an online portal managed by the cloud server 102. The first communication device 104A may check the authenticity of the digital asset for which the NFT is created using a copyright database that may be stored in the cloud server 102. For example, when the first communication device 104A detects the defined signature 416, it may trigger search events in two cloud databases concurrently, such as the main action database 102A and the copyright database pointed by the cloud server 102. In an example, a first search may occur in the copyright database, where if a search result indicates a copyright violation for the digital asset (e.g., image, video, audio), the copyright database decision may get priority and terminate the flow of the plurality of packets. Thus, a signal may be communicated by the cloud server 102 to the first communication device 104A to block the flow of the next packets (i.e., the standard flow of the plurality of data packets of the copyrighted digital asset from the physical layer 414 to the application layer 402 for playing of corresponding data associated with the plurality of data packets may be interrupted on the output component 308. The block flow signal may be communicated even if the main action database 102A defines an action that a charge of "X" amount of token (e.g., $0.01 value) of cryptocurrency is collected for further consumption of the digital asset.

In another implementation, some objects or digital assets may be copyrighted but may be defined in rules to be allowed to get a pass from the copyright database so that an action defined in the main action database 102A is to be executed using the pass. Such rules for copyright management may be defined by the owner of the digital asset who has the copyright at the time of registering for copyright or at the time of generating a defined signature for the digital asset. For example, a copyrighted material may be free-to-use for certain duration, for certain IP addresses, for certain users, or for certain geography, and the like. Thus, based on the DLSC system 108 and the ecosystem 100, such smart and dynamic content rights and event execution management may be enabled.

Figure 5A:
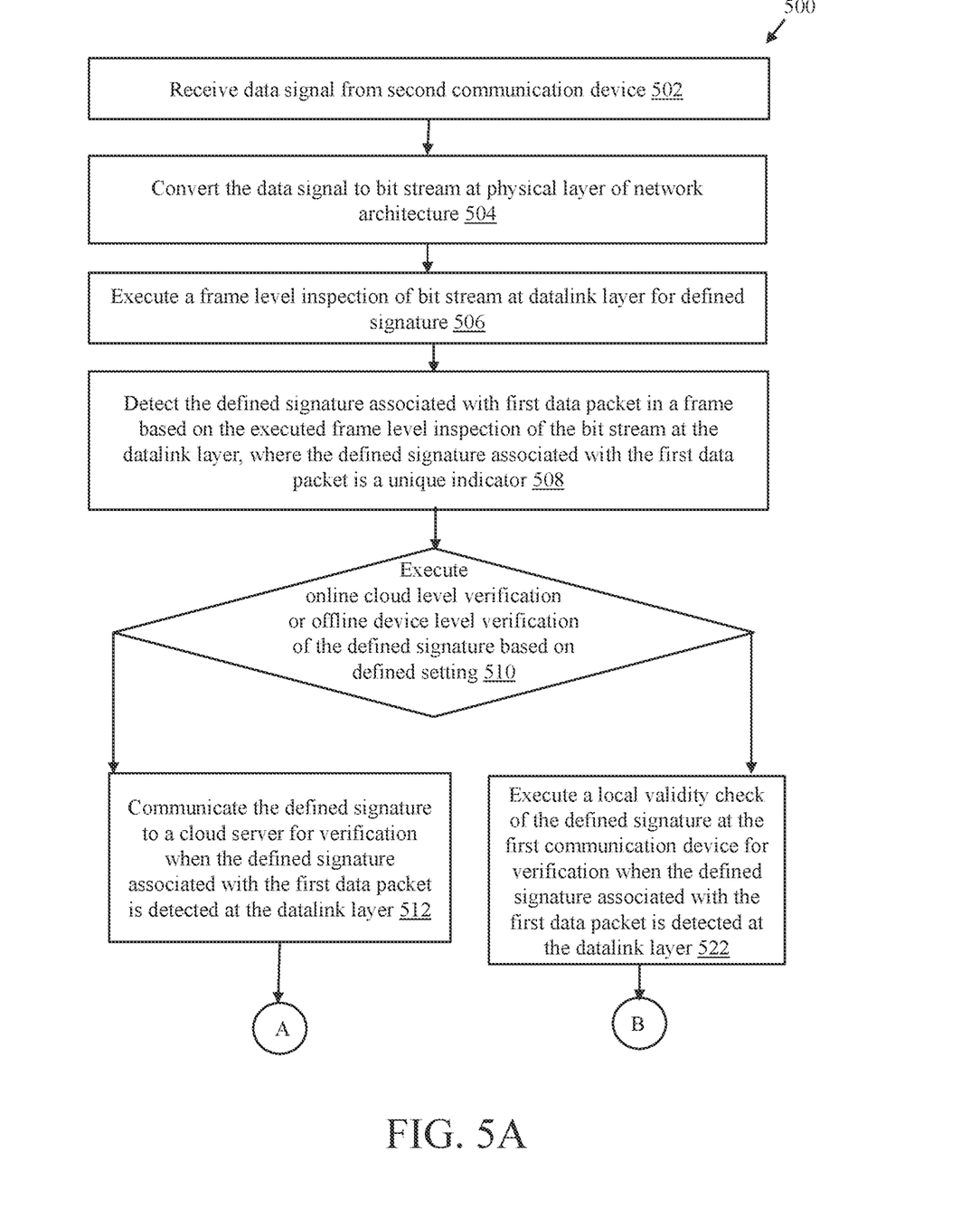
FIGS. 5A, 5B, and 5C collectively is a flowchart diagram illustrating a method for application layer-independent triggering of events in a communication network, in accordance with an embodiment of the disclosure.
Figure 5B:
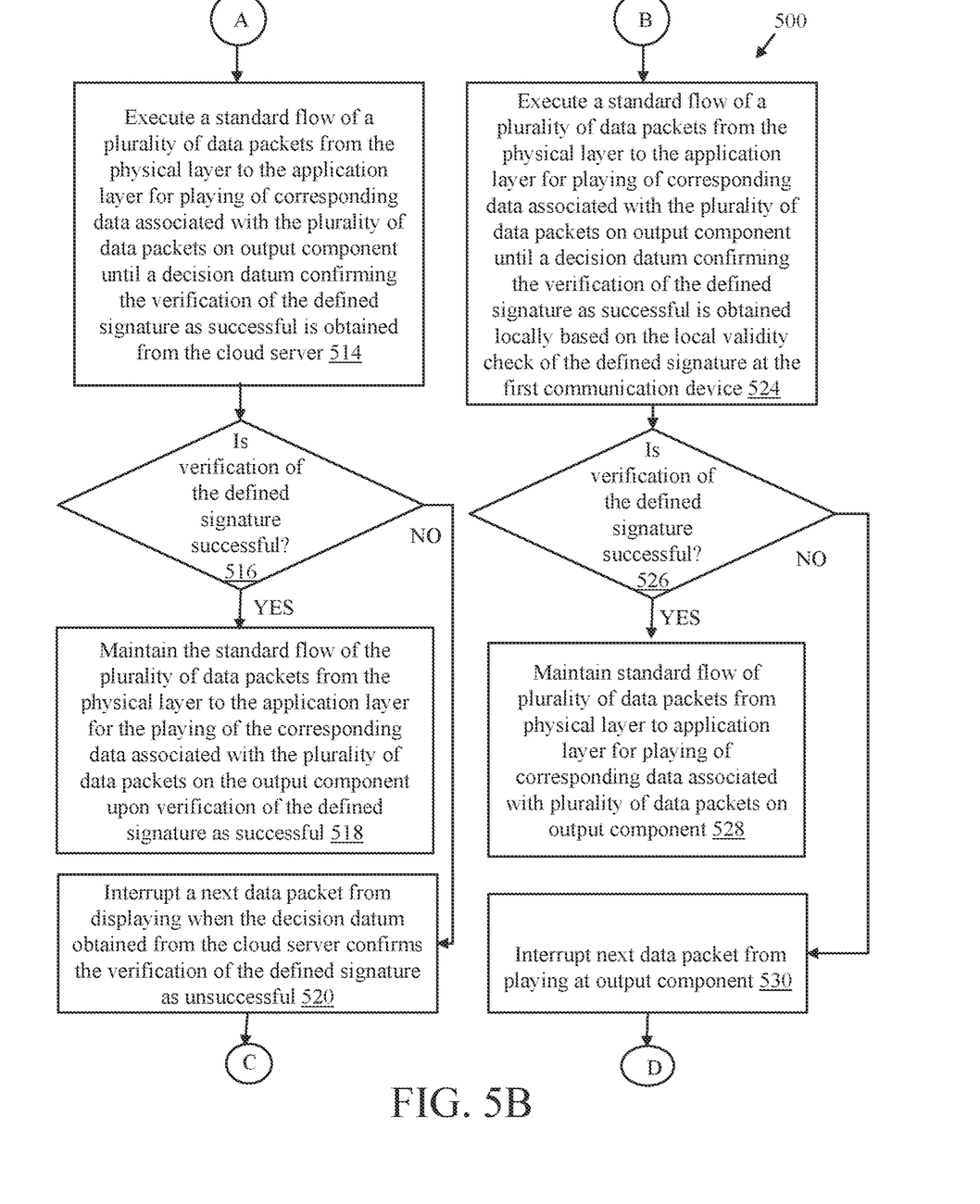
Figure 5C:
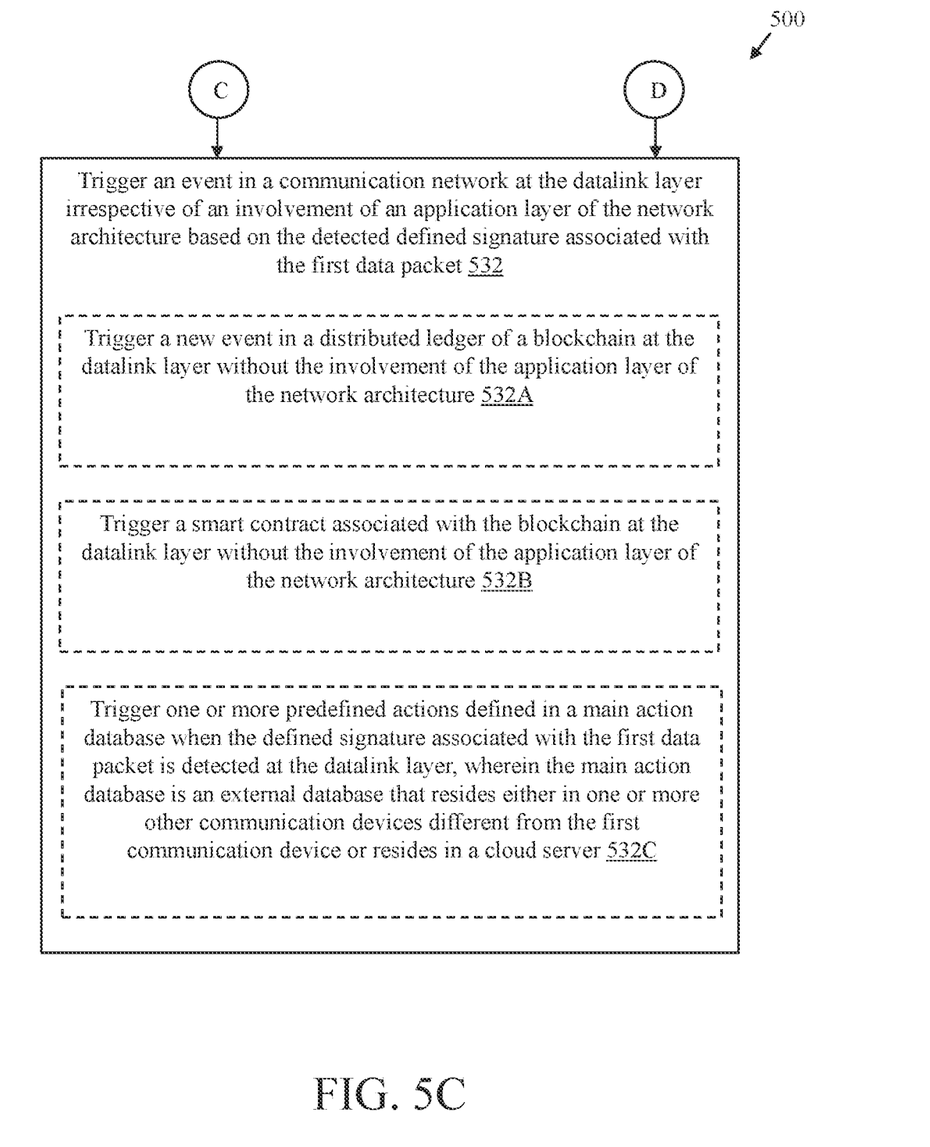

FIGS. 5A, 5B, and 5C collectively is a flowchart diagram illustrating a method for application layer-independent triggering of events in a communication network, in accordance with an embodiment of the disclosure. With reference to FIGS. 5A, 5B, and 5C, there is shown a flowchart 500 comprising exemplary operations 502 through 532. The operations of the method depicted in the flowchart 500 may be implemented in the first communication device 104A (FIGS. 1, 3, and 4).

At 502, a data signal (e.g., the data signal 420) may be received from the second communication device 104B. The processor 302 of the first communication device 104A may be configured to receive the data signal 420 from the second communication device 104B. The data signal 420 received from the second communication device 104B may be a wireless radio signal, an electrical signal received via a physical electrically conductive medium (e.g., a wired medium), or an optical signal.

At 504, the data signal (e.g., the data signal 420) may be converted to a bit stream at the physical layer 414 of the network architecture 400. The processor 302 of the first communication device 104A may be further configured to convert the data signal 420 to a bit stream at the physical layer 414 of the network architecture 400.

At 506, a frame level inspection of the bit stream may be executed at the datalink layer 412 for the defined signature 416. The processor 302 may be further configured to execute a frame level inspection of the bit stream at the datalink layer 412 for the defined signature 416.

At 508, the defined signature 416 associated with a first data packet may be detected in a frame based on the executed frame level inspection of the bit stream at the datalink layer 412. The processor 302 may be further configured to detect the defined signature 416 associated with the first data packet in the frame based on the executed frame level inspection of the bit stream at the datalink layer 412. The defined signature 416 associated with the first data packet may be a unique indicator.

At 510, an online cloud level verification or an offline device level verification of the defined signature 416 may be executed. The processor 302 may be further configured to execute the online cloud level verification or the offline device level verification of the defined signature 416 based on a defined setting. The defined setting may be a user setting that may be set in the communication device or a setting that is dynamically set based on availability of online resources or a type of event to be executed. In a case where the online cloud level verification is selected for execution, the control passes to 512, whereas in a case where the offline device level verification is selected for execution, the control passes to 522.

At 512, the defined signature 416 to the cloud server 102 may be communicated for verification when the defined signature 416 associated with the first data packet is detected at the datalink layer 412. The processor 302 may be further configured to communicate the defined signature 416 to the cloud server 102 for verification when the defined signature 416 associated with the first data packet is detected at the datalink layer 412.

At 514, a standard flow of a plurality of data packets from the physical layer 414 to the application layer 402 may be executed for playing of corresponding data associated with the plurality of data packets on the output component 308 until a decision datum confirming the verification of the defined signature 416 as successful is obtained from the cloud server 102. The processor 302 may be further configured to execute the standard flow of the plurality of data packets from the physical layer 414 to the application layer 402 for playing of corresponding data associated with the plurality of data packets on the output component 308 until a decision datum confirming the verification of the defined signature 416 as successful is obtained from the cloud server 102.

At 516, it may be checked whether the verification of the defined signature 416 is successful. In a case where the verification of the defined signature 416 is successful based on the online cloud level verification, the control passes to 518, or else to 520.

At 518, the standard flow of the plurality of data packets from the physical layer 414 to the application layer 402 may be maintained for the playing of the corresponding data associated with the plurality of data packets on the output component 308 upon verification of the defined signature 416 as successful. The processor 302 may be further configured to maintain the standard flow of the plurality of data packets from the physical layer 414 to the application layer 402 for the playing of the corresponding data associated with the plurality of data packets on the output component 308 upon verification of the defined signature 416 as successful.

At 520, a next data packet may be interrupted from playing when the decision datum obtained from the cloud server 102 confirms the verification of the defined signature 416 as unsuccessful. The processor 302 may be further configured to interrupt the next data packet from playing when the decision datum obtained from the cloud server 102 confirms the verification of the defined signature 416 as unsuccessful.

In the case of the offline device level verification, at 522, a local validity check of the defined signature 416 may be executed at the first communication device 104A for verification when the defined signature 416 associated with the first data packet is detected at the datalink layer 412. The processor 302 may be further configured to execute the local validity check of the defined signature 416 at the first communication device 104A for verification when the defined signature 416 associated with the first data packet is detected at the datalink layer 412. The local validity check of the defined signature 416 at the first communication device 104A may comprise executing a pattern recognition of the defined signature 416 based on at least one of a predefined hardware logic, a predefined driver code, a predefined firmware code, a hashed value index, a bootable image, an operating system kernel image, or a binary image present in the first communication device 104A. The control passes to 524.

At 524, the standard flow of the plurality of data packets from the physical layer 414 to the application layer 402 may be executed for playing of corresponding data associated with the plurality of data packets on the output component 308 until a decision datum confirming the verification of the defined signature 416 as successful is obtained locally based on the local validity check of the defined signature 416 at the first communication device 104A. The processor 302 may be further configured to execute the standard flow of the plurality of data packets from the physical layer 414 to the application layer 402 for playing of corresponding data associated with the plurality of data packets on the output component 308.

At 526, it may be checked whether the verification of the defined signature 416 is successful based on the local validity check. In a case where the verification of the defined signature 416 is successful based on the offline device level validity check (i.e., the local validity check), the control passes to 528, or else to 530.

At 528, the standard flow of the plurality of data packets from the physical layer 414 to the application layer 402 may be maintained for the playing of the corresponding data associated with the plurality of data packets on the output component 308 upon verification of the defined signature 416 as successful from the local validity check of the defined signature 416 at the first communication device 104A. The processor 302 may be further configured to maintain the standard flow of the plurality of data packets from the physical layer 414 to the application layer 402 for the playing of the corresponding data associated with the plurality of data packets on the output component 308 upon verification of the defined signature 416 as successful from the local validity check of the defined signature 416 at the first communication device 104A.

At 530, a next data packet may be interrupted from playing at the output component 308 when the decision datum confirms the verification of the defined signature 416 as unsuccessful. The processor 302 may be further configured to interrupt the next data packet from playing at the output component 308 when the decision datum confirms the verification of the defined signature 416 as unsuccessful. The decision datum may be obtained locally based on the local validity check of the defined signature 416 at the first communication device 104A.

At 532, an event may be triggered in the communication network 106 at the datalink layer 412 irrespective of involvement of an application layer 402 of the network architecture 400 based on the detected defined signature 416 associated with the first data packet. The processor 302 may be further configured to trigger an event in the communication network 106 at the datalink layer 412 irrespective of the involvement of an application layer 402 of the network architecture 400 based on the detected defined signature 416 associated with the first data packet. The defined signature 416 may be pre-registered and pre-assigned to one or more predefined actions in the main action database 102A. The triggering of the event in the communication network 106 at the datalink layer 412 may further comprise sub-operations 532A, 532B, and/or 532C.

At 532A, a new event may be triggered in the distributed ledger 114 of a blockchain 422 (i.e., the DLSC system 108) at the datalink layer 412 without the involvement of the application layer 402 of the network architecture 400. At 532B, a smart contract 112a (of the smart contract system 112) associated with the blockchain 422 at the datalink layer 412 may be triggered without the involvement of the application layer 402 of the network architecture 400. At 532C, one or more predefined actions defined in the main action database 102A may be triggered when the defined signature 416 associated with the first data packet is detected at the datalink layer 412. In an implementation, the method, and the communication devices, such as the first communication device 104A, of the present disclosure may be suitable for various low latency mission critical applications, in which the verification of the defined signature 416 and the triggering of events are enabled on-the-fly using the ecosystem 100. Examples of the low latency mission critical applications may include, but not limited to in the areas of entertainment, multimedia, gaming, augmented reality (AR), virtual reality (VR), shared virtual environment (e.g., metaverse), real-time video conferencing, vehicle to everything (V2X), teleoperated driving, telecommunication based services, and drones operated through mobile networks.

Various embodiments of the disclosure may provide a non-transitory computer-readable medium having stored thereon, computer-implemented instructions that, when executed by a computer, causes the computer to execute operations to receive a data signal from another device (e.g., the second communication device 104B). The operations further include converting the data signal to a bit stream at the physical layer 414 of the network architecture 400. The operations further include executing a frame level inspection of the bit stream at the datalink layer 412 for the defined signature 416. The operations further include detecting the defined signature 416 associated with a first data packet in a frame based on the executed frame level inspection of the bit stream at the datalink layer, where the defined signature associated with the first data packet is a unique indicator. The operations further include triggering an event in the communication network 106 at the datalink layer 412 irrespective of an involvement of the application layer 402 of the network architecture 400 based on the detected defined signature 416 associated with the first data packet.

Various embodiments of the disclosure may include the first communication device 104A that comprises the processor 302. The processor 302 may be configured to receive a data signal from the second communication device 104B. The processor 302 may be further configured to convert the data signal to a bit stream at the physical layer 414 of the network architecture 400. The processor 302 may be further configured to execute a frame level inspection of the bit stream at the datalink layer 412 for the defined signature 416. The processor 302 may be further configured to detect the defined signature 416 associated with a first data packet in a frame based on the executed frame level inspection of the bit stream at the datalink layer, where the defined signature 416 associated with the first data packet is a unique indicator. The processor 302 may be further configured to trigger an event in the communication network 106 at the datalink layer 412 irrespective of an involvement of the application layer 402 of the network architecture 400 based on the detected defined signature 416 associated with the first data packet.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory or any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A first communication device, comprising:
   a processor configured to:
   receive a data signal from a second communication device;
   convert the data signal to a bit stream at a physical layer of a network architecture;
   execute a frame level inspection of the bit stream at a datalink layer for a defined signature;
   detect the defined signature associated with a first data packet in a frame based on the executed frame level inspection of the bit stream at the datalink layer, wherein the defined signature associated with the first data packet is a unique indicator; and
   trigger an event in a communication network at the datalink layer irrespective of an involvement of an application layer of the network architecture based on the detected defined signature associated with the first data packet.

2. The first communication device according to claim 1, wherein the processor is further configured to communicate the defined signature to a cloud server for verification when the defined signature associated with the first data packet is detected at the datalink layer.

3. The first communication device according to claim 2, wherein the processor is further configured to execute a standard flow of a plurality of data packets from the physical layer to the application layer for playing of corresponding data associated with the plurality of data packets on an output component until a decision datum confirming the verification of the defined signature as successful is obtained from the cloud server, wherein the output component is a part of the first communication device or is an external component distinct from the first communication device and communicatively coupled to the first communication device.

4. The first communication device according to claim 3, wherein the processor is further configured to maintain the standard flow of the plurality of data packets from the physical layer to the application layer for the playing of the corresponding data associated with the plurality of data packets on the output component upon the verification of the defined signature as successful.

5. The first communication device according to claim 3, wherein the processor is further configured to interrupt a next data packet from playing when the decision datum obtained from the cloud server confirms the verification of the defined signature as unsuccessful.

6. The first communication device according to claim 1, wherein the processor is further configured to execute a local validity check of the defined signature at the first communication device for verification when the defined signature associated with the first data packet is detected at the datalink layer.

7. The first communication device according to claim 6, wherein the local validity check of the defined signature at the first communication device comprises executing a pattern recognition of the defined signature based on at least one of: a predefined hardware logic, a predefined driver code, a predefined firmware code, a hashed value index, a bootable image, an operating system kernel image, or a binary image present in the first communication device.

8. The first communication device according to claim 6, wherein the processor is further configured to execute a standard flow of a plurality of data packets from the physical layer to the application layer for playing of corresponding data associated with the plurality of data packets on an output component until a decision datum confirming the verification of the defined signature as successful is obtained locally based on the local validity check of the defined signature at the first communication device.

9. The first communication device according to claim 8, wherein the processor is further configured to maintain the standard flow of the plurality of data packets from the physical layer to the application layer for the playing of the corresponding data associated with the plurality of data packets on the output component upon the verification of the defined signature as successful from the local validity check of the defined signature at the first communication device.

10. The first communication device according to claim 9, wherein the processor is further configured to interrupt a next data packet from playing at the output component when the decision datum confirms the verification of the defined signature as unsuccessful, wherein the decision datum is obtained locally based on the local validity check of the defined signature at the first communication device.

11. The first communication device according to claim 1, wherein the processor is further configured to trigger one or more predefined actions defined in a main action database when the defined signature associated with the first data packet is detected at the datalink layer, wherein the main action database is an external database that resides either in one or more other communication devices different from the first communication device or resides in a cloud server.

12. The first communication device according to claim 11, wherein the defined signature is pre-registered and pre-assigned to the one or more predefined actions in the main action database.

13. The first communication device according to claim 1, wherein the triggering of the event in the communication network comprises triggering a new event in a distributed ledger of a blockchain at the datalink layer without the involvement of the application layer of the network architecture.

14. The first communication device according to claim 13, wherein the triggering of the event in the communication network further comprises triggering a smart contract associated with the blockchain at the datalink layer without the involvement of the application layer of the network architecture.

15. The first communication device according to claim 1, wherein the data signal is received from the second communication device is at least one of: a wireless radio signal, an electrical signal received via a physical electrically conductive medium, or an optical signal.

16. A method, comprising:
   in a first communication device:
   receiving a data signal from a second communication device;
   converting the data signal to a bit stream at a physical layer of a network architecture;
   executing a frame level inspection of the bit stream at a datalink layer for a defined signature;
   detecting the defined signature associated with a first data packet in a frame based on the executed frame level inspection of the bit stream at the datalink layer, wherein the defined signature associated with the first data packet is a unique indicator; and triggering an event in a communication network at the datalink layer irrespective of an involvement of an application layer of the network architecture based on the detected defined signature associated with the first data packet.

17. The method according to claim 16, further comprising communicating the defined signature to a cloud server for verification when the defined signature associated with the first data packet is detected at the datalink layer.

18. The method according to claim 16, further comprising executing a local validity check of the defined signature at the first communication device for verification when the defined signature associated with the first data packet is detected at the datalink layer.

19. The method according to claim 16, further comprising triggering one or more predefined actions defined in a main action database when the defined signature associated with the first data packet is detected at the datalink layer, wherein the main action database is an external database that resides either in one or more other communication devices different from the first communication device or resides in a cloud server.

20. The method according to claim 16, wherein the triggering of the event in the communication network comprises triggering a new event in a distributed ledger of a blockchain at the datalink layer without the involvement of the application layer of the network architecture.

* * * * *